Patented Apr. 19, 1932

1,854,355

UNITED STATES PATENT OFFICE

MAX WALLERSTEIN, OF NEW YORK, N. Y., ASSIGNOR TO WALLERSTEIN COMPANY, INC., OF NEW YORK, N. Y., A CORPORATION OF NEW YORK

METHOD OF MAKING CHOCOLATE SIRUP

No Drawing. Application filed March 28, 1931. Serial No. 526,117.

This invention relates to an improved method or process of producing a substantially non-thickening chocolate flavored sirup of the kind which is usually prepared from sugar, cocoa powder and water.

The chocolate flavored sirups or cocoa sirups of commerce, such as are used at soda fountains or for home consumption and the like, are usually prepared by first mixing the sugar and the cocoa powder of commerce in suitable proportions, the proportion of the cocoa powder generally used being from 10–15% of the amount of sugar used. To this mixture sufficient water is added to make a paste, and then more water in sufficient quantity to dissolve the sugar and give the sirup the proper concentration, this usually corresponding to a density of 30–40 Bé. at room temperature. This mixture of sugar, cocoa powder and water is then slowly heated to about 85° C., with constant stirring, being at times brought to a boil. After this heating the density of the sirup is adjusted to the desired consistency by the addition of water, and the finished sirup is then canned and sterilized, or a preservative such as benzoate of soda is added.

Such chocolate flavored sirups when freshly prepared are smooth, flow freely and are readily pourable. Such sirups, however, retain these properties for a comparatively short time and after a certain period, which varies from a few weeks to a few months, the sirup changes in appearance and physical characteristics. Such sirups gradually thicken so that they are difficult to pour, and frequently set entirely so that they cannot be poured and are thus useless, and on this account are objectionable to the trade, and because of this the ordinary custom has been to supply the trade with as nearly fresh sirup as possible in order to prevent loss on account of this tendency to thicken in the mass.

The causes of this thickening or setting of this kind of sirup are not entirely understood, but in a copending application—Serial No. 265,222, filed March 27, 1928, I have described a method discovered by me for preventing the thickening or setting of the sirup, which usually occurs after the same has been kept for a considerable time, by treating the cocoa mass, before it is finished into a sirup, with an amylolytic enzyme, such as malt extract, under proper conditions so that the valuable cocoa fats are retained in the sirup, the process being carried out under suitable control of the water content. Such sirup is of good keeping qualities, remains fluid, substantially stable and freely flowable, and does not set to any substantial extent.

It is the particular object of the present invention to improve this process and to produce a sirup which is freely flowable, substantially stable and non-thickening, and in which protein substances contained in the cocoa are so altered or modified that they become soluble and more readily digestible, this sirup having a smoother texture and a greatly improved flavor, and which sirup also at the same time retains the cocoa fats. I have discovered that a much improved sirup can be obtained by treating the cocoa mass with both an amylolytic enzyme and a proteolytic enzyme under suitable conditions as to temperature, pH, and water content.

The proteolytic enzyme to be used for this purpose must be such that under the required conditions it will act to modify or alter protein substances contained in the cocoa mass. A proteolytic enzyme well adapted for this purpose is the enzyme papain. The quantity to be used depends, of course, upon the proteolytic activity of the enzyme, and as a general rule I have found that 1 part of papain to each 200–300 parts of cocoa is a satisfactory proportion.

As a specific example for carrying out my improved process, I proceed as follows: 100 lbs. of cocoa powder or cocoa nibs, which have first been crushed and ground, are mixed with 40 gallons of water at a pH of 5.5. To this is added ¼ lb. of malt extract having a diastatic or converting power of 120° Lintner, and the mass is slowly heated to about 80° C. At this temperature a thickening or gelatinization of the cocoa paste sets in and after about one hour, with the temperature preferably raised to 90° C., the gelatinization is sufficiently complete for the enzymatic treatment. The mass is then cooled down to 40° C. and 1 lb. of malt extract having 120° Lintner, previously dissolved in a little water, is mixed in, and then there is added to the mass ½ lb. of papain. The mass is then kept for about four hours at 55° C. and the temperature raised to 65° C. and kept there for twelve hours. By this procedure the starchy constituents of the cocoa are practically all saccharified and the proteolytic enzyme of the papain has altered or modified protein substances so that they become soluble and more digestible.

After this digestion, 800–900 lbs. of sugar are added and dissolved under constant stirring, and the sirup is then adjusted to the desired concentration by heating and may then be filled into suitable containers.

In the best practice of the invention, when making sirup of a sugar concentration higher than 60% of the sugar content, it is necessary to invert sufficient of the sucrose to prevent crystallization, such inversion being carried out separately either by the enzyme, invertase or by diluted tartaric acid.

Although I have given papain as a matter of example, I do not restrict myself to the use of this enzyme, as other proteolytic enzymes, such as bromelin, which have the power to modify or alter the protein substances contained in the cocoa are suitable and may be used within the scope of the process.

By this process I have produced a freely flowable, substantially stable non-thickening cocoa or chocolate sirup which maintains its freely flowable characteristics after long periods and in which the cocoa fats are retained. It has also been established by accurate tests that this chocolate sirup aids in digesting milk. This has been proven by the fact that the curd of the milk to which this chocolate sirup has been added is in a much finer and more flocculent condition, and more quickly and more readily acted upon by the digestive juices of the stomach.

What is claimed is:

1. The process of producing a fluid, substantially stable non-thickening chocolate flavored sirup from cocoa, which consists in subjecting a pasty or sirupy mixture of cocoa and water to the action of an amylolytic enzyme and a proteolytic enzyme until the conversion of the starch in the cocoa is substantially complete and the protein content is modified and altered, under such conditions of concentration that the cocoa fats are retained in an emulsified condition and the mixture remains freely flowable, and then finishing into a chocolate flavored sirup.

2. The process of producing a fluid, substantially stable non-thickening chocolate flavored sirup from cocoa, which consists in subjecting a pasty or sirupy mixture of cocoa and water to the action of an amylolytic enzyme and papain until the conversion of the starch in the cocoa is substantially complete and the protein content is modified and altered, and adjusting the concentration of the mass so that the cocoa fats are retained in an emulsified condition and the mixture remains freely flowable, and then finishing into a chocolate flavored sirup.

3. The process of producing a fluid, substantially stable non-thickening chocolate flavored sirup from cocoa, which consists in subjecting a pasty or sirupy mixture of cocoa and water to the action of diastatic malt sirup and papain until the conversion of the starch in the cocoa is substantially complete and the protein content is modified and altered, and adjusting the concentration of the mass so that the cocoa fats are retained in an emulsified condition and the mixture remains freely flowable, and then finishing into a chocolate flavored sirup.

In testimony whereof, I have hereunto set my hand.

MAX WALLERSTEIN.